United States Patent
Malyutenko et al.

(10) Patent No.: US 7,084,405 B1
(45) Date of Patent: Aug. 1, 2006

(54) SEMICONDUCTOR GENERATION OF DYNAMIC INFRARED IMAGES

(75) Inventors: Volodymyr K. Malyutenko, Kiev (UA); James R. Kircher, Mendon, NY (US); Robert L. Murrer, Jr., Sewickley, PA (US); Donald R. Snyder, III, Crestview, FL (US); Oleg Y. Malyutenko, Kiev (UA); Vyacheslav V. Bogatyrenko, Kiev (UA)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 199 days.

(21) Appl. No.: 10/845,609

(22) Filed: May 7, 2004

Related U.S. Application Data

(60) Provisional application No. 60/490,333, filed on Jul. 25, 2003.

(51) Int. Cl.
*G21F 4/00* (2006.01)
*H01L 31/00* (2006.01)
(52) U.S. Cl. .............................. 250/370.08; 250/493.1
(58) Field of Classification Search .......... 250/370.08, 250/493.1
See application file for complete search history.

(56) References Cited

U.S. PATENT DOCUMENTS

| | | | |
|---|---|---|---|
| 4,178,514 A | 12/1979 | Bly | |
| 4,914,296 A | 4/1990 | Reinhold et al. | |
| 5,144,149 A * | 9/1992 | Frosch | 250/493.1 |
| 5,160,992 A | 11/1992 | Gerard et al. | |
| 5,345,093 A | 9/1994 | Mathur | |
| 5,386,126 A | 1/1995 | Henderson et al. | |
| 5,600,148 A | 2/1997 | Cole et al. | |
| 5,710,431 A | 1/1998 | Spindler | |
| 6,127,692 A | 10/2000 | Sugawa et al. | |
| 6,433,919 B1 | 8/2002 | Chowdhury et al. | |
| 6,995,371 B1 * | 2/2006 | Garber et al. | 250/330 |

OTHER PUBLICATIONS

V.K. Malyutenko et al., "Semiconductor Screen Dynamic Visible to Infrared Scene Converter", SPIE Journal, SPIE 4818, pp. 147-156, Dec. 2002.

* cited by examiner

*Primary Examiner*—Otilia Gabor
(74) *Attorney, Agent, or Firm*—AFMCLO/JAZ; Gerald B. Hollins

(57) ABSTRACT

A high-speed, high-resolution, broadband dynamic infrared scene generator based on semiconductor transducer conversion of visible spectrum scene images into infrared spectrum images. Wavelength conversion is accomplished in the semiconductor material through absorption of visible spectrum energy by valence electrons in a subsurface layer of the semiconductor material and photogeneration by valence band to conduction band electron transfer occurring within about one diffusion length of the semiconductor material surface. The semiconductor material used, for example Germanium or Silicon provides a band gap energy value that is smaller than the quantum energy level of the optical emission. Temperature of the semiconductor material may be maintained at a selected level above or below that of the infrared scene. Infrared images of higher frequency content than are achievable with conventional thermal heating infrared converters are accomplished. The invention thus includes down conversion of visible generated light in order to develop a semiconductor pixel-less Dynamic Infrared Scene Projector capable of simulating high-speed broadband IR scenery.

25 Claims, 9 Drawing Sheets

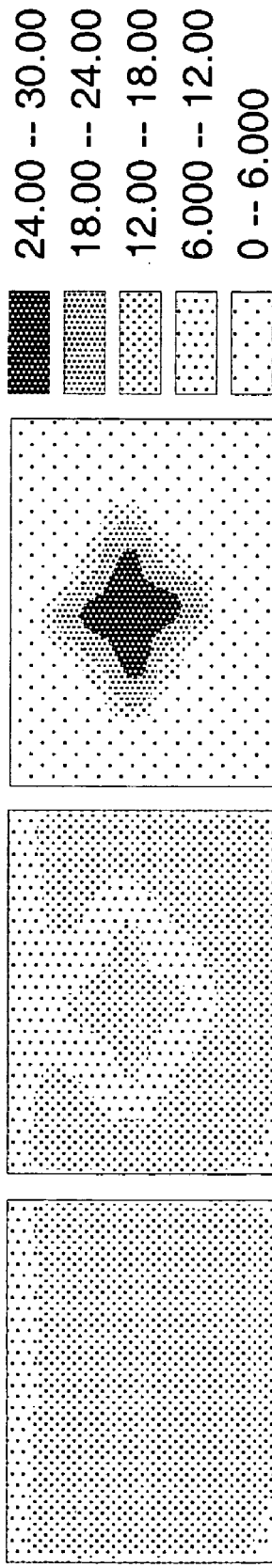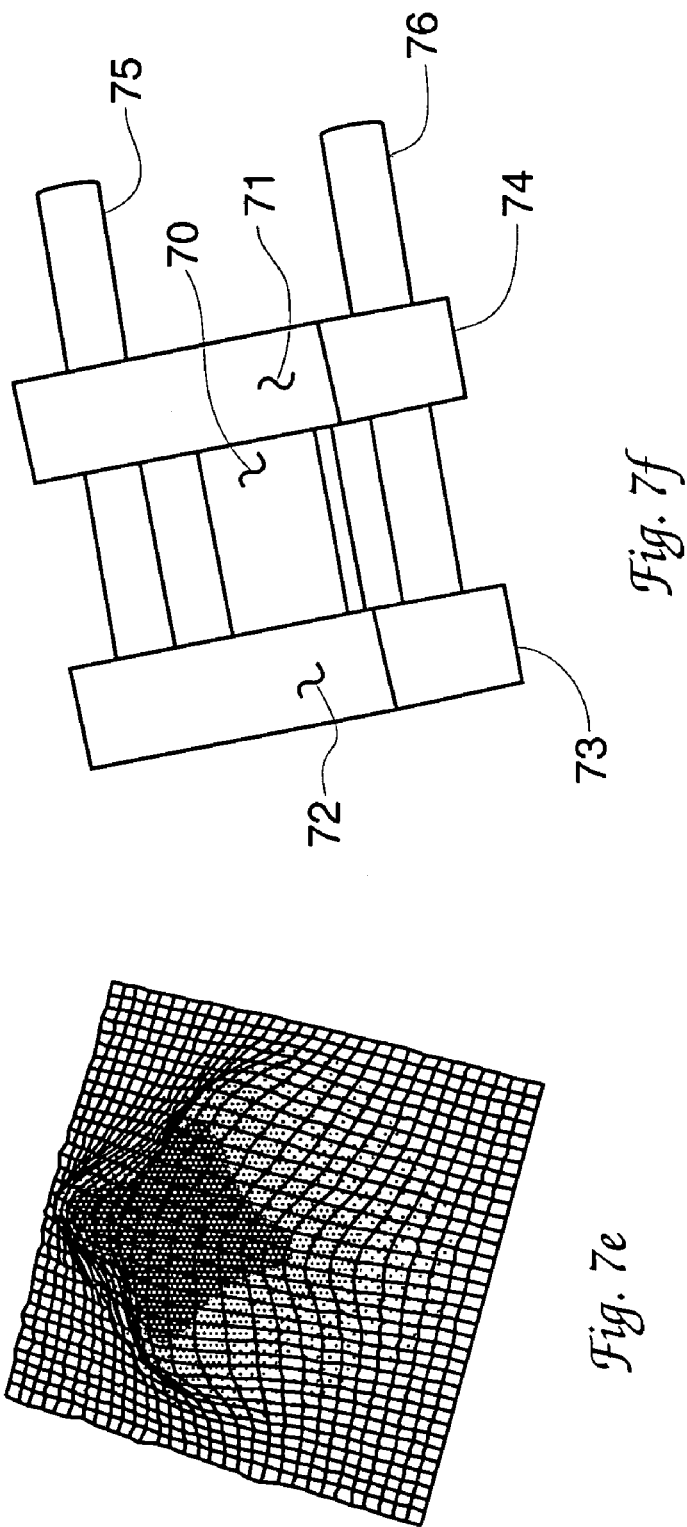
Fig. 7a  Fig. 7b  Fig. 7c  Fig. 7d  Fig. 7e  Fig. 7f

SEMICONDUCTOR GENERATION OF DYNAMIC INFRARED IMAGES

CLAIM OF PRIORITY

This application claims the benefit of U.S. Provisional Patent Application No. 60/490,333, filed Jul. 25, 2003. The contents of this provisional application are hereby incorporated by reference herein.

RIGHTS OF THE GOVERNMENT

The invention described herein may be manufactured and used by or for the Government of the United States for all governmental purposes without the payment of any royalty.

BACKGROUND OF THE INVENTION

The generation of synthetic infrared scenery is desirable for testing and calibrating of infrared devices. Night vision apparatus is a notable example of such devices finding significant military usage in current world events. Experience has shown that a large scale outdoor environment does not offer the repeatability or controllability of test conditions needed for the development of, or the testing and maintenance of, such equipment. For these reasons, since the early 1990's there has been significant progress in developing synthetic infrared scenery such as Dynamic Infrared Scene Projectors for use in Hardware-in-the-Loop Simulations capable of end-to-end testing and calibration of imaging IR devices.

Previously a number of different Dynamic Infrared Scene Projectors have been used. Among these are emissive devices such as thin films, bridges or suspended membrane resistors; transmissive devices such as liquid crystals and galvanic cells; reflective devices such as deformable mirrors, membrane cells and spatial light modulators; projector devices, as well as laser scanners of different types. At the current time, emissive projectors based on the advanced suspended membrane resistor arrays, together with the laser diode array projectors, appear to be leading the Dynamic Infrared Scene Projectors field. However, thermal resistor arrays suffer from long time constants, often involving response times greater than milliseconds and are limited in power dissipation capability. Narrow band laser diode arrays are limited to those applications where monochromatic projection and a non-Lambertian IR beam pattern (i.e., a luminous distribution that is non-uniform for all directions) are acceptable.

Additionally Dynamic Infrared Scene Projector approaches utilizing finite dimension pixel technology result in a relatively low fill-factor (F) value such as F<0.5 for small pixel areas. In contrast the present invention provides high-speed, high-resolution, broadband dynamic infrared scene generation with maximum fill factor values.

SUMMARY OF THE INVENTION

The present invention provides a semiconductor transducer-based high-speed, high-resolution, broadband dynamic infrared scene generator that is controlled by a dynamic visible image input.

It is therefore an object of the present invention to provide a semiconductor transducer based dynamic visible spectrum to infrared spectrum scene converter.

It is another object of the invention to provide a discrete pixel free source of dynamic infrared images.

It is another object of the invention to provide a high-speed broadband infrared scene generator.

It is another object of the invention to provide a free carrier absorption based infrared scene source.

It is another object of the invention to provide a thermal time constant-free source of infrared scenes.

It is another object of the invention to provide a visible pumping-based source of infrared images.

It is another object of the invention to provide a discrete pixel-free visible to infrared converter.

It is another object of the invention to provide a source of infrared scenery useful in the testing and calibrating of infrared imaging devices such as night vision goggles.

It is another object of the invention to provide an infrared scene source that is usable over a wide range of surrounding environment temperatures.

It is another object of the invention to provide an infrared scene generator having low background emission characteristics.

It is another object of the invention to provide a dynamic infrared scene projector capable of simulating high-speed broadband infrared scenery.

It is another object of the invention to provide a dynamic infrared scene projector wherein non-equilibrium infrared thermal emission of a scene generated in a semiconductor plate takes place in a spectral region beyond the fundamental absorption range of the semiconductor material.

It is another object of the invention to provide a dynamic infrared scene projector wherein apparent scene temperature is affected by non equilibrium current carrier concentration arising from free carrier absorption.

These and other objects of the invention will become apparent as the description of the representative embodiments proceeds.

These and other objects of the invention are achieved by a broadband, high-speed, semiconductor material free-carrier-charge-based, method of generating dynamic infrared images, said method comprising the steps of:

disposing a planar sample of said semiconductor material along an optical axis extending through a source of visible image input data and an input surface of said semiconductor material;

locating an infrared image viewing apparatus proximate said optical axis adjacent one surface of said semiconductor material planar sample;

maintaining said planar sample of semiconductor material at a selected operating temperature;

projecting a visible spectrum input optical radiation image of quantum energy level greater than a forbidden zone band-gap energy characteristic of said semiconductor material onto said semiconductor material input surface;

said projecting step including pumping of free carrier charges of said semiconductor material between valence band and conduction band energy states in a visible spectrum input optical image-controlled photogeneration-recombination broadband emission of infrared spectrum energy toward said infrared image viewing apparatus.

BRIEF DESCRIPTION OF THE DRAWINGS

The accompanying drawings incorporated in and forming a part of the specification, illustrates several aspects of the present invention and together with the description serve to explain the principles of the invention. In the drawings:

FIG. 7 shows output images and a transducer screen mounting arrangement for the present invention.

DETAILED DESCRIPTION OF THE INVENTION

Figure 1:
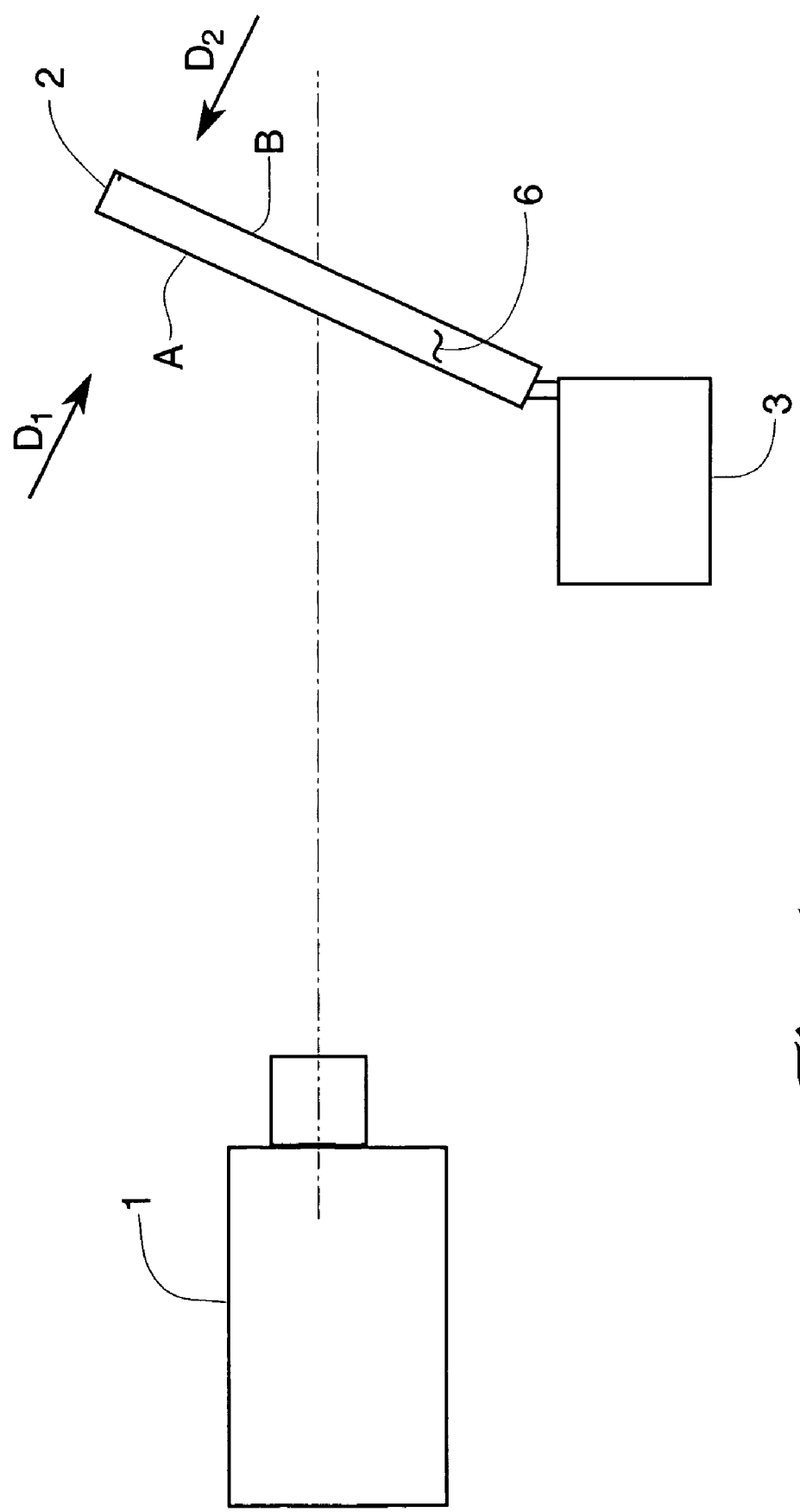
FIG. 1 shows a general schematic view of an infrared scene generator device made in accordance with the present invention.

FIG. 1 in the drawings presents a general schematic view of a Dynamic Infrared Scene Projector device made in accordance with the present invention. The FIG. 1 device includes an optical radiation projector 1, a semiconductor visible to infrared conversion screen 2 and a conversion screen temperature-maintaining device 3. At A in FIG. 1 is a surface of the conversion screen 2 that is facing optical radiation projector 1; B is the opposite side of the conversion screen 2. Observation of the generated infrared images can be accomplished from one or both of the D1 or D2 directions depending on the arrangement of the conversion screen 2 as is described below herein.

Figure 2:
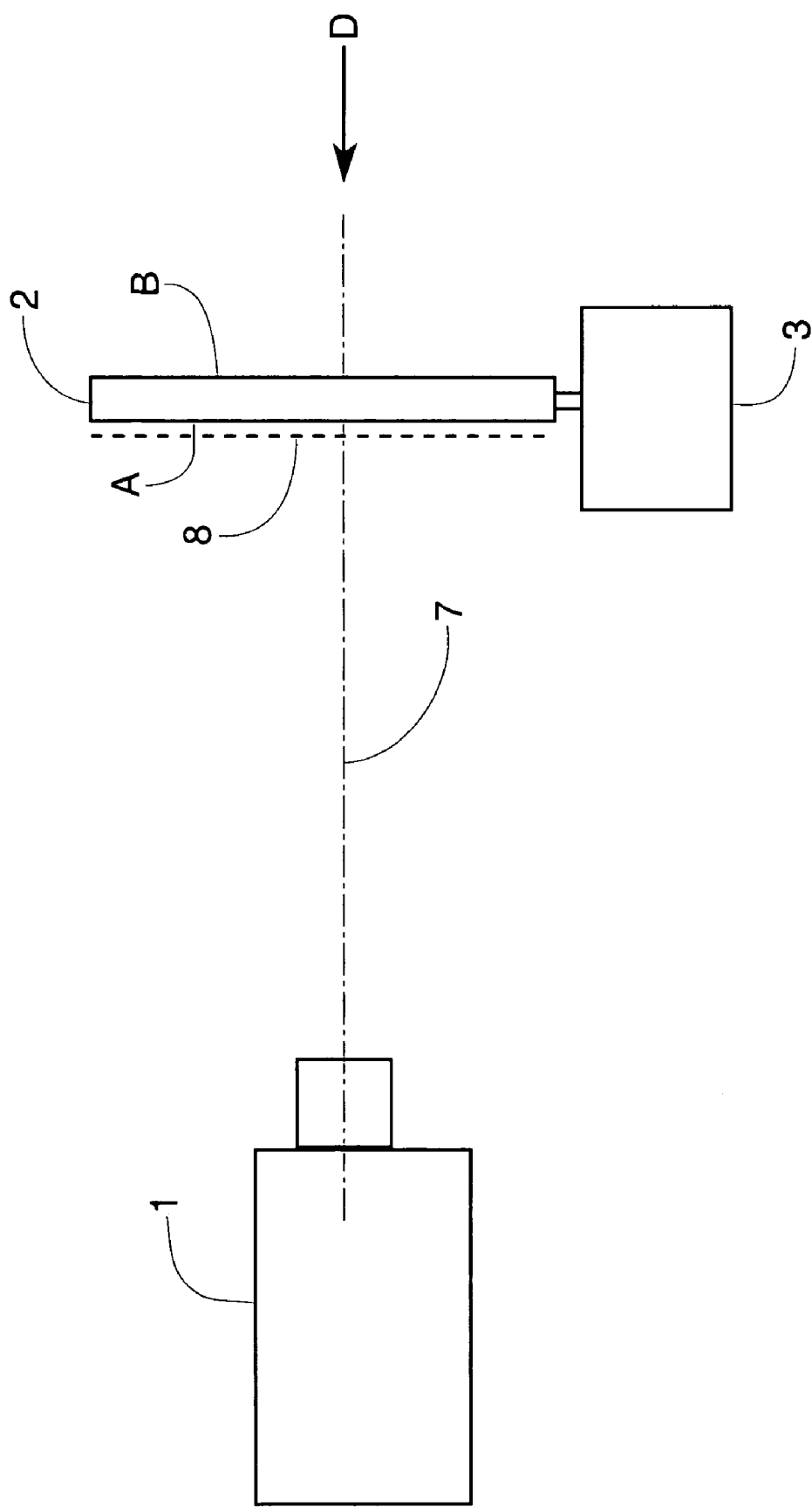
FIG. 2 shows a schematic of a second infrared scene generator device made in accordance with the invention.

FIG. 2 in the drawings presents a schematic diagram of another version of the invention in which the conversion screen 2 is disposed perpendicular or orthogonal to the optical axis of the optical radiation projector 1. Observation of the infrared images can be done in the D direction in the FIG. 2 arrangement of the invention as is also described more fully below herein.

Figure 3:
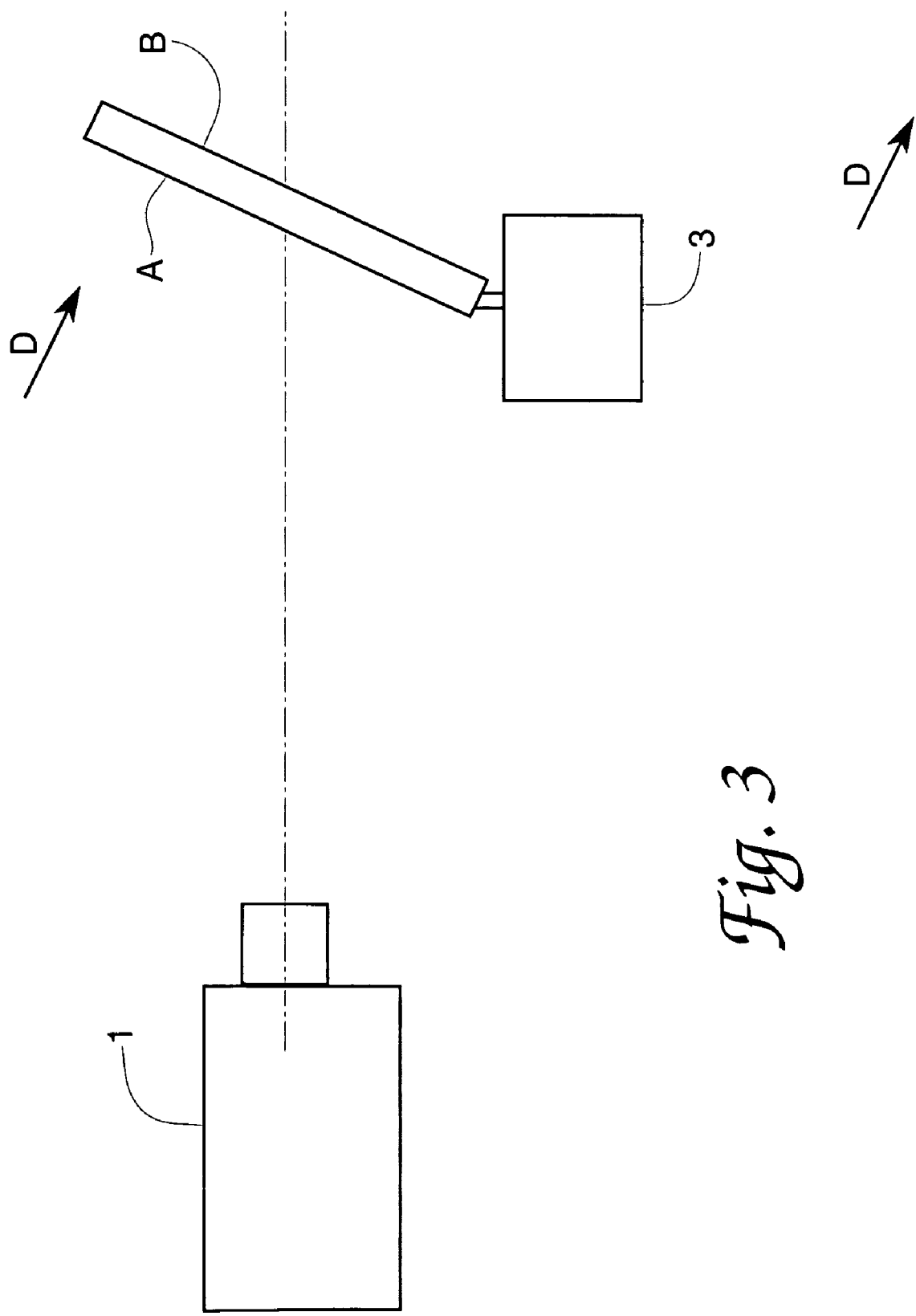
FIG. 3 shows a schematic of a third infrared scene generator device made in accordance with the invention.

FIG. 3 in the drawings presents a schematic of another version of the invention in which the conversion screen is tilted toward the optical axis of the projector 1. Observation of the infrared images can be done in D direction in the FIG. 3 version of the invention.

Figure 4:
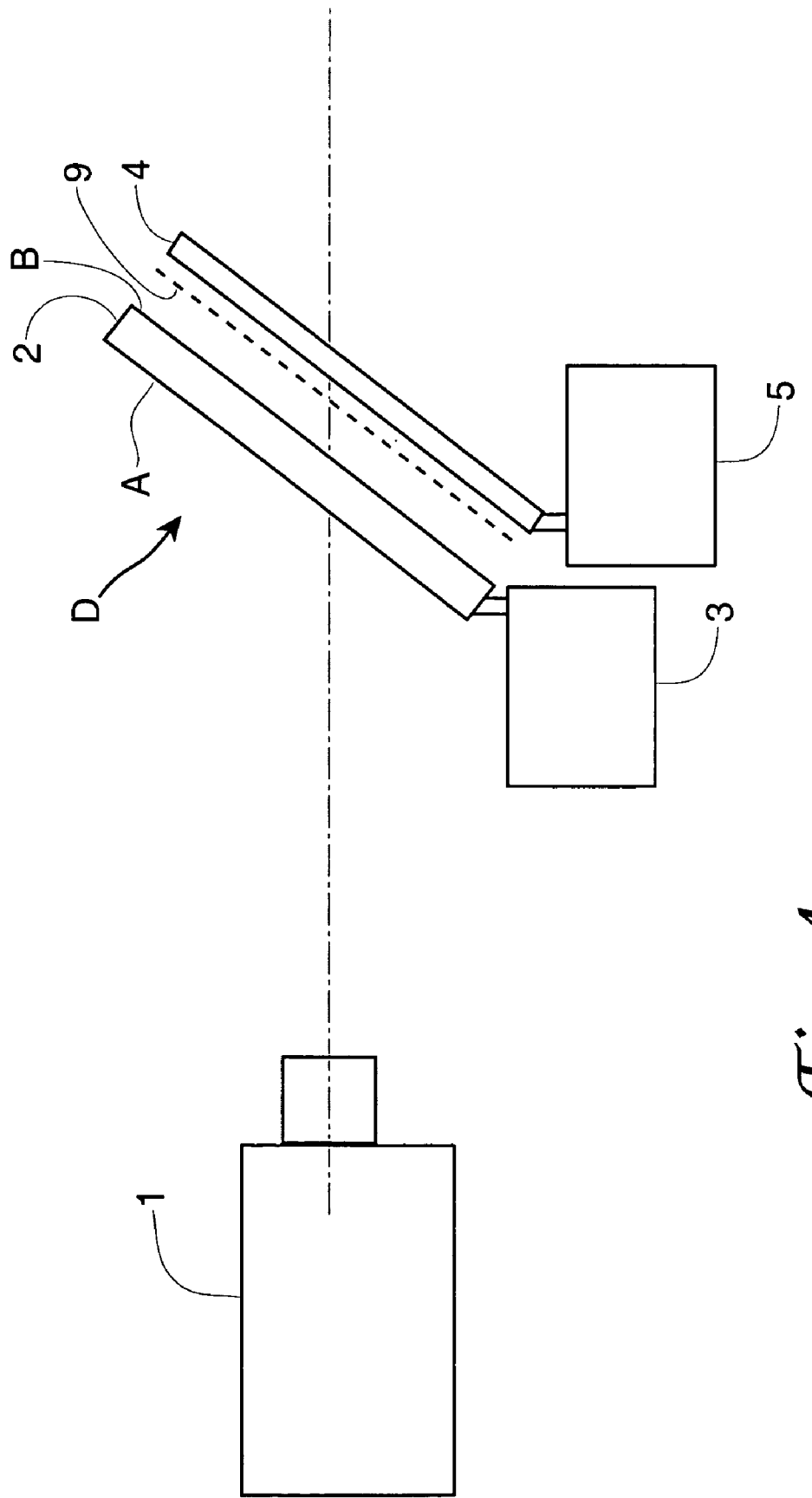
FIG. 4 shows a schematic of a fourth infrared scene generator device made in accordance with the invention.

FIG. 4 in the drawings presents a schematic of another version of the invention in which the conversion screen is tilted toward the optical axis of the projector 1. The FIG. 4 device contains optical radiation projector 1, conversion screen 2, heater 3 and additionally background screen 4 and background screen cooler 5 and is described more fully in later parts of this document.

The FIG. 1 arrangement of the invention operates as follows. An optical image is projected by the optical radiation projector 1 on to the surface A of the converting screen 2, a plate 6 of semiconductor material such as Germanium operating with a temperature different from the background temperature; a temperature maintained by the screen temperature control 3. In the FIG. 1 device those quantums of optical radiation not reflected from the surface of the semiconductor plate 6 are absorbed by valence electrons in the subsurface layer of the plate 6 located within a thickness of some tens of microns of the screen surface. This absorption results in a layer irradiated by optical energy and located under the plate 6 surface wherein photogeneration of free charge carriers occurs provided the quanta of received energy, $\hbar \omega$, exceeds the fundamental absorption range of the material band gap, E.g., (i.e., $\hbar \omega > E_g$). This range usually includes the visible and near-infrared sector of the spectrum. Photogeneration and diffusion of free charge carriers occurs in the volume of the semiconductor plate 6 between the plate surface and a distance of about carrier diffusion length from the surface sites. Wherever greater irradiance of these sites occurs, the concentration of free charge carriers grows greater as well. This relationship may be better appreciated from the following mathematical analysis.

The absorption coefficient, k, of the electromagnetic emission in a spectral range of free charge carrier absorption (free carrier absorption range, $\hbar \omega < E_g$) depends on the concentration of the free charge carriers:

$$k = n\sigma_n + p\sigma_p, \quad (1)$$

where n and p represent concentration of the free electrons and holes respectively;

$\sigma_n$, $\sigma_p$ are the cross sections for the absorption of the free electrons and holes respectively. The last two values are frequency-dependent and are well-established for most semicondictor materials. From equation (1) it becomes clear, that a free charge carrier concentration increase at one site of the semiconductor plate 6 causes the absorption coefficient k of this site to increase the over all free carrier absorption range. This range usually includes the infrared (IR) range of the spectrum.

Emissivity E, of the semiconductor plate 6 in a spectral range of free charge carrier absorption i.e in the IR spectral range is predicted by a mathematical relationship disclosed in a technical journal article authored by one of the inventors of the present invention, i.e., by a relationship disclosed in the V. K. Malyutenko authored article "THERMAL EMISSION OF SEMICONDUCTORS: INVESTIGATION AND APPLICATION" appearing in the Journal Infrared Physics, volume 32, 1991, pages 291–302. This journal article is hereby incorporated by reference herein. This mathematical relationship is:

$$E = (1-R)*(1-\eta)/1 - R*\eta \quad (2)$$

Where:

R is the reflection coefficient of electromagnetic radiation,

η is the transmission factor of the semiconductor plate in the above mentioned spectral range and is equal to:

$$\eta = \exp\left(-\int_0^d k(x)dx\right) \quad (3)$$

where d is the thickness of the semiconductor plate; and x is the coordinate of the thickness;

Therefore, from equation (3), it follows that an increase of the absorption coefficient k at a specific site of the semiconductor plate area will cause the transmission factor η of this location to decrease. (The more the plate absorbs, the less it transmits.) From equation (3) it follows that an increase in the absorption coefficient (k) of a specific location of the semiconductor plate results in the decrease in a transmission factor η of this site, and from formula (2) it follows that the decrease of the transmission factor η at this site of the semiconductor plate gives an increase of emissivity E of this site. Thus, from equations (1)–(3) it follows that the increase in concentration of free charge carriers in a specific site of the semiconductor plate (provoked by optical projector 1 exitation in the visible to near infrared ranges) gives an increase in the emissivity E of this site in the infrared spectral range. This free charge carrier absorption is defined by the number density of the free charge carriers i.e. by the power of optical projector 1. From equations (1) through (3) we also can see that as the concentration of the free charge carriers increases, E will increase also. These relationships provide support for the present invention.

The total flux of the IR radiation emitting from a semiconductor plate consists of the spontaneous IR thermal emission from the plate, the background infrared radiation passing through the plate and the background infrared radiation reflected from the plate (background radiation is considered to be black-body radiation). The power of spontaneous IR thermal emission of a unit area of the surface of a plate is:

$$Ws = E*I(T) \quad (4)$$

Where:

T is the temperature of the plate,

I(T) is the power of the infrared radiation of a unit area of the surface of a black body at temperature T in this spectral range. The total power of the radiation tansmitted by the plate and reflected by the plate is equal to:

$$We = (1-E)*I(Tg), \quad (5)$$

Where:

Tg is the temperature of the surroundings;

I(Tg) is the power of the infrared radiation from a unit area of a black body radiator at temperature T(g) in this spectral range.

Then the full power of the IR radiation per unit area of the surface of the plate is equal to:

$$W = E*I(T) + (1-E)I(Tg \quad (6)$$

From equation (6) we see that the change in the Emissivity (E) of one area of the semiconductor plate 6 with respect to its equilibrium value will cause the thermal infrared emission (W) of that site to change. The difference will be equal to, $$\Delta W = \Delta E(I(T) - I(Tg)), \quad (7)$$

where,

ℏ ΔE is the difference in Emissivity of the area E when we compare it to the its usual value.

From equation (7) we see that the higher ℏ ΔE is, the higher is |ℏ ΔW| and ℏ ΔW>0, if T>Tg and ℏ ΔW<0 if T<Tg.

As we can see from equations (1)–(7), the more the concentration of the free charge carriers in one area of the semiconductor plate 6 differs from its equilibrium value, the more the power of the infrared emission from the plate differs from its equilibrium value and so the apparent temperature that is being simulated by this area differs from its equilibrium value. Therefore the power of the thermal IR emission (or apparent temperature value) of the different local areas of the semiconductor plate 6 varies depending on the intensity of illumination of these areas at the plate 6 by the optical source 1. This relationship provides the theoretical basis for the present invention.

Therefore in the plane of the conversion screen 2 in the drawings of the present invention the 2-dimensional infrared image duplicates, according to a scale of 1:1, the 2-dimensional optical image that was projected in visible or near infrated range on the surface of the conversion screen 2. Thus, as a matter of fact, an all-optical process downcovresion of radiation is achieved.

In the FIG. 2 version of the present invention a conversion screen 2 is located perpendicular to the optical axis 7 of the projector and the generated infrared image can be observed from the B side surface of the screen 2. In the FIG. 2 device, a coating 8 has been applied to the surface of the conversion screen on the projector side (and is also located perpendicular to the projector optical axis 7). The coating 8 is transparent to the radiation of optical source 1 and reflects the generated infrared radiation. Operation of the FIG. 2 apparatus can be described as follows. A 2-dimensional optical image is projected by the optical radiation projector –1 on the surface A of the conversion screen 2. Optical radiation with minimum losses passes through the visible light transparent anti-reflective coating 8 that is applied to the surface A, and is absorbed by the conversion screen 2, causing a power change of the infrared radiation of the areas of the conversion screen 2. Infrared emission that radiates from the conversion screen 2 in the direction of the surface A is reflected by the coating 8 applied to the surface A and is subsequently redirected to the surface B. As a result, the efficiency of conversion for the projector 1 visible or near IR radiation being converted into infrared radiation is increased when the Infrared images are observed from side B.

The anti-reflective coating 8 may be of the conventional type, generally a thin layer of material applied to the surface to reduce the amount of reflected energy. Ideally the index of refraction of the coating material should be equal to the square root of the product of the indices of the material on either side of the coating, while the ideal thickness for a single-layer coating is one-quarter of the wavelength (or not an even number of one-quarter wavelengths) of the minimized reflectance wavelength. An anti-reflective coating may also be made up of multiple layers of material having alternating high and low refractive indices. In this arrangement it is possible to achieve coatings having a variety of properties including spectrally high-pass, low-pass or band pass properties.

For present invention purposes, with a screen made of Germanium, this anti-reflective coating, 8, can be made of thermally evaporated ZnS. Such a ZnS film is easy to thermally evaporate onto a Germanium substrate and in fact Germanium and ZnS are a classical material pair to demonstrate "film" effects. ZnS provides an index of refraction of n=2.3 at a wavelength of one micrometer; n=2.23 at four micrometers and n=2.17 around ten micrometers. Germanium has an index of refraction of n=4 for the entire spectral range. As a result, for a projector wavelength of one micrometer and output radiation of 8–12 micrometers wavelength, a ZnS film thickness at surface A of 2.1 micrometers makes available only small reflections (of estimated less than 10%) of projector light and maximum reflection of IR radiation. A 0.98 micrometers-thin ZnS film provides a similar effect when the IR radiation is measurted with a 3–5 micrometers wavelength-responsive camera.

In the FIG. 3 version of the present invention where the conversion screen is tilted towards the optical axis of the projector, the formed infrared image can be observed from the side A of the surface. This version of the invention has a coating that is antireflective (transparent) to the visible and IR radiation on the surface A that is facing the projector and a coating on the opposite surface B that reflects infrared radiation. Operation of the FIG. 3 apparatus can be described as follows. A 2-dimensional optical image is projected on the surface A of the conversion screen 2. This radiation passes with minimal losses through the transparent coating on the surface A, and is absorbed by the semiconductor material of the conversion screen 2, causing a change in the power of the infrared emission of the conversion screen areas. The screen's infrared emission that radiates from the conversion screen in the direction of the surface B is redirected to the surface A, which, has the transparent to infrared emission coating. As a result, the conversion efficiency increases as does the dynamic range of the apparent temperatures that are being represented. In the FIG. 3 arrangement of the invention using a Germanium semiconductor screen, a thermally evaporated A-side ZnS film of 0.98 micrometers thickness is transparent for both one micrometer projector radiation and 8–12 um IR radiation and a one micrometer Al (aluminium) film evaporated onto the B side provides better than 95% of IR radiation rejection. For achieving a 3–5 micrometers spectral range of IR radiation the measured ZnS film should be on the order of 0.5 micrometers in thickness.

When a heater is employed for maintaining the operational temperature of the conversion screen in the present invention the invention is enabled to represent temperatures that are higher than temperature of the surroundings. When a cooler is employed for maintaining the operational temperature of the conversion screen in the present invention the invention is enabled to represent temperatures that are lower than the temperature of the surroundings.

FIG. 4 in the drawings shows an arrangement of the present invention in which an additional background screen 4 is disposed in parallel with the conversion screen on the side opposite the projector 1. This background screen 4 is fabricated in the manner of a metallic plate, with an infrared emission absorbing surface coating applied to it, in order to absorb infrared emission. The FIG. 4 arrangement of the invention has an added device 5 for cooling the background screen 4.

Radiation of infrared emission from the FIG. 4 conversion screen 2 consists of the spontaneous infrared emission of the conversion screen 2 and the infrared emission of the environment that 1) passes through the conversion screen 2 (i.e., backside radiation) and 2) is reflected by the conversion screen 2 (i.e., frontside radiation). In this version of the invention backside radiation consists of infrared emission flow of the surrounding at a temperature Tg that passed initilay through conversion screen 2 and was reflected from the background screen 4, and passed again through the conversion screen (primary flow), and spontaneous infrared emission of the background screen 4 at the temperature Tb that is lower than Tg, that passed through the conversion screen −2 (secondary flow).

Because of the infrared-absorbing coating 9 that has been applied to the surface of this background screen 4 that is facing conversion screen 2, the coefficient of the infrared radiation reflection from the background screen 4 has been lowered. This leads to a power decrease in the primary flow. Since the background screen 4 is cooled to a temperature that is lower that the temperature of the surrounding environment, power of the secondary flow also decreases (two orders and more if Tb is lower than −125° C.). As a result, full infrared emission flow of the surrounding that comes from the surface A decreases, and this allows a decrease in the device minimum (equilibrium) apparent temperature to achieve a low background emission characteristic.

Moreover, the FIG. 4 arrangement of the invention allows one to achieve a minimum represented temperature that is lower than the temperature of the surroundings. For this purpose let us assume that the temperature of the conversion screen 2 at (T) is equal to the temperature of the surrounding Tg. Then the infrared emission power that is coming from the surface A of the conversion screen is lower than power of the infrared emission that comes from the area of a black body surface kept at the temperature of the surrounding I(Tg), so the minimum temperature that is being represented is lower than Tg. If T increases, the minimum temperature that is being represented also increases, below a certain value of T (that depends on the semiconductor material that is being used, temperature of the background screen 4, thickness of the conversion screen 2 and other parameters) and the minimum temperature that is being represented becomes higher than the Tg. Therefore, the FIG. 4 version of the present invention allows us to represent temperatures that are higher than the temperature of the surrounding as well as temperatures that are lower than the temperature of the surrounding.

Additionally, the FIG. 4 arrangement of the invention allows expanding the dynamic range of the temperatures that are being represented. If the illumination of the conversion screen 2 area by the optical emission increases, the absorption coefficient in the infrared range of the spectrum also increases, and the transmission factor in the infrared spectrum of this area decreases. As a result, the power of the infrared emission of the background radiation that passes through that area decreases. When the illumination of this area is increased, the power of the infrared emission flow transmitted by this area of the background radiation becomes negligible compared to the power of the infrared emission reflected by this area. The power of the full flow of the infrared emission of the background that comes from this area is equal to the power of the infrared emission flow of the background that was reflected by this area, on which the background screen has no effect. Temperatures that are being represented are equal to the temperatures that would be represented without a background screen. Because the minimum temperature that is being represented is decreased in this FIG. 4 version of the device, the dynamic range of the temperatures that is being represented expands.

The background screen 4 may be made of thin (1–2 mm) metalic plate (of Aluminum or Copper composition) that is covered with for example a black coating 9 such as paint or one of the black materials disclosed in the U.S. Pat. No. 4,178,514 of V. T. Bly or similar materials. (The contents of the Bly U.S. Pat. No. 4,178,514 patent are hereby incorporated by reference herein.) The screen 4 may be cooled in some convenient manner such as for example by using the operating surface of a Peltier cooler. The temperature of the background screen 4 cooled surface should be lower than the temperature of the surrounding environment.

Another arrangement for the present invention involves use of an energy source for maintaining conversion screen operational temperature through electrical contacts that are connected directly to the to the conversion screen. In this arrangement the operational temperature of the conversion screen is maintained higher than the temperature of the surroundings by heating the conversion screen with an electrical current passing through the conversion screen semiconductor material itself. Metalized contacts such as are fabricated in transistor and integrated circuit applications of Germanium and Silicon and other semiconductor materials may be used for this form of conversion screen heating. The conversion screen may be also heated in other ways, such as by a hot air stream.

When crystalline Germanium is used as the semiconductor material visible light can be used as the image source for generating free charge carriers. In such an arrangement (as is described in more detail in the following paragraphs of this document) a visible wavelength optical radiation projector with tungsten incandescent lamp can illuminate the crystalline Germanium conversion screen plate 2 surface and this provides a 2-dimensional optical test image. The temperature of the plate 2 surface is maintained from 0° C. to 150° C. by an attached heater 3. From the side opposite to the plate 2 surface a two dimensional infrared image in the wavelength range from 8 to 12 micrometers can be measured with the help of for example an AGEMA Thermovision 880™ Infrared radiometer. The conversion screen transducer time constant is determined by the effective free charge carrier life time and can range from milliseconds (in undoped material) to some nanoseconds in intentionally doped material. One Germanium material we tested for example provides a time constant τ=300 microseconds. A dynamic range of apparent temperatures greater than 100° C. can be achieved.

Materials

The semiconductor materials used in various arrangements of conversion screen 2 may be of several different types and variations within a type. Germanium and Silicon materials are for example found to provide desirable performance in the transducer function of screen 2 and are discussed in greater detail in the following example embodiments of the invention. Other semiconductor materials such as CdS, CdSe, CdTe and additional Periodic Table Group 11-V1 compounds are also believed to be suitable for use in the conversion screen 2. Within each semiconductor material type the arrangements of the FIG. 2 through FIG. 4 drawings provide additional examples of the invention and differences in physical properties and doping levels provide yet other examples of the invention.

EXAMPLE CLASS 1

Germanium in a FIG. 1 Semiconductor Screen

Infrared Outputs in the 8 to 12 Micrometers Wavelength Range

For this example class an n-doped sample of optically transparent homopolar Germanium semiconductor having an electrical resistivity, ρ, value between 0.1 and 45 ohm-cm is used. The element Antimony, Sb, is used as an n-dopant in this material. Doping at this level is a compromise between infrared transparency and intrinsic hole concentration providing minimum initial natural emissivity when heated. The needed doping level is screen operating-temperature dependent. Doping is achieved during crystal growth using a classic Chohralski or Bridgment process. Such doping of Germanium semiconductor material to achieve transparency is described in the technical journal paper "Absorption Coefficient of Ge at 10.6 mkm" authored by P. Bishop and A. Gibson, Applied Optics, volume 12, number 11, pages 2549–2550, 1973; the contents of this paper are also hereby incorporated by reference herein.

The Example Class 1 semiconductor sample is chemo-mechanically polished to optical flatness and then is chemically etched for about 5 seconds in boiling $H_2O_2$ (6%) achieving desirable minimum surface recombination velocity of about 100 centimeters/second. One surface of the resulting semiconductor sample is then treated with an anti reflection coating, a coating composed of CdSe in a layer of 0.8 micrometer thickness.

When heated to a temperature up to 150 degrees Celsius and illuminated with a tungsten lamp source visible light image of quantum energy level above the band gap energy level of the Example Class 1 Ge material, the achieved semiconductor material provides an 8 to 12 micrometers wavelength output infrared image that may be mapped with the AGEMA Thermovision 880 LW Infrared radiometer and that may be described as the following specific class 1 examples as are identified as examples 1a through 1e.

1a. Intrinsic Ge, ρ=45 Ohm.cm (doped with negligable n-type level, $N_d-N_a=2.2 \cdot 10^{13}$ cm$^{-3}$), τ=280 microseconds, screen dimensions are 2×1.2×0.35 cm$^3$. The output infrared image apparent temperatures measured in the initial state ($T_1$=32.7° C.) and under illumination ($T_2$=60.5° C.) and result in the apparent temperature difference ΔT=27.8° C.

1b. Ge n-doped, ρ=3.0 Ohm.cm ($N_d-N_a=6.0 \cdot 10^{14}$ cm$^{-3}$), τ=380 microseconds, T=82° C., 1.6×1.6×0.35 cm$^3$ dimensions. The output infrared image temperatures are $T_1$=27.4° C. and $T_2$=68° C., ΔT=40.6° C.

1c. The above mentioned (Example 1b) screen when not covered with transaprency coating provides the results of: $T_1$=23.8° C., $T_2$=53.3° C., ΔT=29.5° C.

1d. Ge n-doped, ρ=3.0 Ohm.cm ($N_d-N_a=6.0 \cdot 10^{14}$ cm$^{-3}$), τ=170 microseconds, T=84° C., 1.6×1.6×0.2 cm$^3$ dimensions. $T_1$=36° C., $T_2$=65.4° C., ΔT=29.6° C. Additional information regarding this Example 1d is disclosed in the FIG. 7 drawing and in the discussion relating to FIG. 7 below herein.

1e. Ge n-doped ρ=0.9 Ohm.cm ($N_d-N_a=2.0 \cdot 10^{15}$ cm$^{-3}$), τ=50 microseconds, T=90° C., 1.8×1.8×0.4 cm$^3$ dimensions. The output infrared image temperatures are $T_1$=33° C. and $T_2$=48.8° C., ΔT=15.8° C.

EXAMPLE CLASS 2

Silicon in a FIG. 1 Semiconductor Screen

Infrared Outputs in the 3 to 5 Micrometers Wavelength Range

2a. Si n-doped, ρ=500 Ohm.cm, τ=2.5 milliseconds, T=240° C., 14.4×20.5×8.4 mm$^3$ dimensions. $T_1$=86° C. and $T_2$=190° C., ΔT=104° C.

2b. Si p-doped, ρ=11000 Ohm.cm, τ=1 millisecond, T=232° C., 17.2×18×9.2 mm$^3$ dimensions. $T_1$=86.2° C. and $T_2$=164° C., ΔT=77.8° C.

The following additional disclosure concerning our present invention includes portions in repetition of parts of the above discussion as well as portions complementary to the above discussion; it is therefore believed helpful in achieving complete theoretical and practical understandings of the invention.

In the present invention the non-equilibrium infrared thermal emission power of a scene generated in a doped semiconductor plate takes place in a spectral region beyond the fundamental absorption range (the absorbed quantum, $\hbar \omega < E_g$, where $E_g$ is the forbidden gap value). Additionally, the apparent temperature scene temperature is strictly affected by non equilibrium current carrier concentration (due to so-called free carrier absorption). As a result of band-to-band photo generation of excess carriers (visible pumping), the non-equilibrium infrared thermal emission power can approach that for the black body value (with allowance for reflectivity) at a given temperature. In other words, free carrier absorption creates a dynamic increase of semiconductor emissivity over the whole infrared spectral range.

Physical Concepts-Basic Relations.

If we consider the non-equilibrium infrared thermal emission power of a semiconductor screen with the thickness d, reflection coefficient R and absorption coefficient K (that can depend on optical frequency ω and coordinate) whose temperature T differs from the background temperature $T_g$ then the total spectral power of radiation emitted by the unit surface area with allowance for multiple reflections is determined by the expression $$P_\omega^{tot} = P_\omega + RJ_\omega(T_g) + \frac{\eta(1-R)^2}{1-R\eta} J_\omega(T_\omega) \quad (8)$$

where the second and third terms are the reflected and crystal-traversed background emission fluxes and the first term is spontaneous TE power of the scene, $$P_\omega = \frac{(1-R)(1-\eta)}{1-R\eta} J_\omega(T) = \varepsilon J(T) \quad (9)$$

$$\eta = \exp\left(-\int_0^d K(x)dx\right), \quad (10)$$

where η is the factor of light transmission through the scene and $J_\omega(T)$ is the spectral power distribution of the blackbody (i.e., the well-known Planck distribution). Equations 8–11 appear in the technical journal article "Thermal Emission in Semiconductors. Investigation and Application", by V. K. Malyutenko, Infrared Physics, 32, pp. 291–302, 1991; this article is hereby incorporated by reference herein.

$$J_\omega(T) = \frac{\hbar\omega^3}{4\pi^2 c^3}\left(\exp\frac{\hbar\omega}{k_B T} - 1\right)^{-1} \quad (11)$$

Thus, the spontaneous non-equilibrium infrared thermal emission power of the scene is the product of two factors, namely, $J_\omega(T)$ and the emissivity factor $\varepsilon=(1-R)(1-\eta)(1-R\eta)^{-1}$ whose spectral dependence determines the thermal emission parameters of the scene. This emissivity factor $\varepsilon=(1-R)(1-\eta)(1-R\eta)$ relationship appears in the journal article "Dynamic Infrared Scene Projection: a Review" by OWEN M. Williams, Infrared Physics & Technology 39, pp. 473–486, 1998, an article that is hereby also incorporated by reference herein. As one can see from equation (9), for actual bodies the thermal emission power is less than that of the blackbody. In two limiting cases, of low (Kd<<1) and high (Kd>>1) absorption levels, the thermal emission power is of the form $$P_\omega^{min} = KdJ_\omega(T),$$

$$P_\omega^{max} = (1-R)J_\omega(T). \quad (12)$$

The high absorption level (Kd>>1) is not of practical importance, since in this case the thermal emission spectral distribution is almost the same as that of the black body (with allowance for reflectivity) and is not affected by the pumping. Contrarily, in the case of low absorption level (Kd<<1) the thermal spectrum (and the thermal emission integral power) are determined by the value and spectral dependence of the absorption coefficient K.

Physical Concepts-Free Electrons and Holes as the Active Media of Dynamic Infrared Scene Projectors It is the free carrier absorption range ($\hbar\omega<E_g$) where the absorption coefficient depends on current carriers and therefore the thermal emission power value can be affected through modulation of free carrier concentration. Fundamentally, the absorption coefficient in this spectral range is connected to free electron and (or) hole concentration $K=\sigma_n n$ ($\sigma_n$ is absorption cross-section of a quantum of given frequency, ω, by free electrons). Thus photo excitation of the scene with quanta energy of $\hbar\omega>E_g$, that changes the n value relative to $n_0$, results in the modulation of radiated thermal emission power for a thin semiconductor screen at the longer wavelength spectral range $\hbar\omega<E_g$ (i.e., down conversion occurs).

$$\frac{\Delta P_\omega}{P_{0\omega}} = \frac{\bar{n}-n_0}{n_0}, \bar{n} = \frac{1}{d}\int_0^d n(x)dx, \quad (13)$$

$$P_{0\omega} = d\sigma_n n_0 \lfloor J_\omega(T) - J_\omega(T_g)\rfloor,$$

Furthermore a linear ΔP versus Δn dependence is valid. Further increase of pumping power generates a remarkable increase of free carrier concentration, creating a gradual opaqueness of the display screen and saturation of infrared thermal emission comparable to that for the blackbody kept at the same temperature. Wherever a short wavelength pattern of light is projected onto the screen a corresponding IR image develops on the thin transducer element proportional in intensity to the heated temperature of the once transparent transducer element and the intensity of the visible light addressing the transducer screen.

Physical Concepts-Optimizing the Scene Parameters

Figure 5:
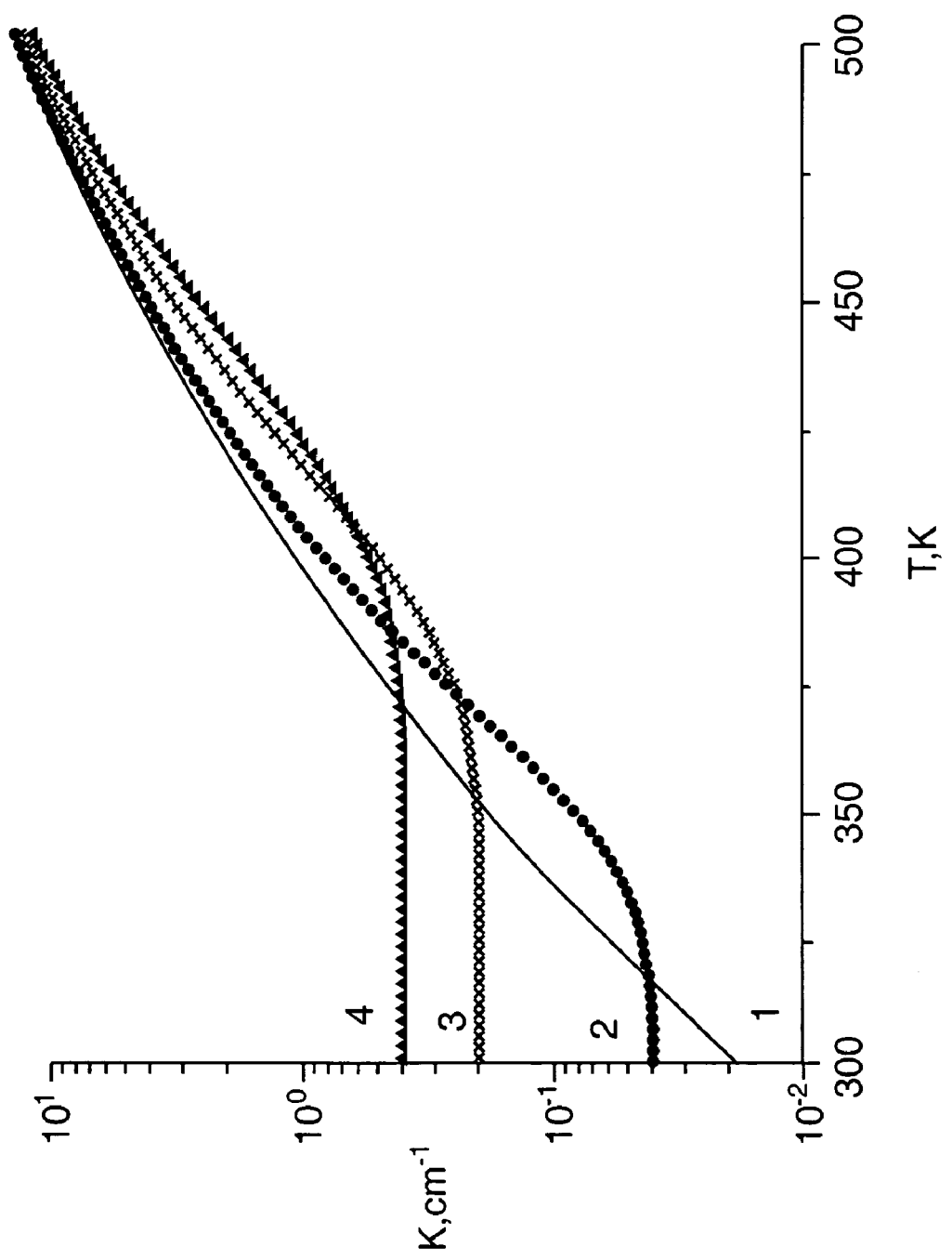
FIG. 5 shows a doping absorption coefficient for Germanium semiconductor material with respect to temperature for a wavelength, λ, of 10.6 micrometers.

At higher temperatures (T>300° K), the free electrons and holes are both responsible for the absorption coefficient value $\Delta K=(\sigma_n+\sigma_p)\Delta n$ as the semiconductors (like Ge or Silicon) become intrinsic (with $n_0=p_0$). It is significant however, that the absorption cross section for holes exceeds that for electrons ($\sigma_p>>\sigma_n$). For example, in Ge at λ=10.6 μm and T=300° K, $\sigma_p=68.10^{-17}$ cm² whereas $\sigma_n=4.10^{-17}$ cm². As a result, it is the hole component that is predominately responsible for IR thermal emission value. To minimize emission from the screen with no scene input power from the visible source it is desirable to reduce the hole concentration thereby minimizing the initial thermal emission power of the scene (see equation 13). This is preferably performed by intentional scene transducer n-type doping (wherein $N_d>N_a$). As the intrinsic concentration of free carriers $n_i$ ($n_i^2=n_0 p_0$) depends on the material temperature, the optimum n-doping level appears to be a temperature dependent value also. The temperature dependence of the doping absorption coefficient for several doping levels in Germanium is shown in FIG. 5 of the drawings herein. As one can see from this FIG. for low temperature scenes (T<300° K) the screen may be practically undoped. At higher temperatures, in the 450>T>350° K range, slightly doped Germanium is desirable, whereas for scenes operated at even higher temperatures (T>450° K) the Germanium should be highly doped. For the results presented in FIG. 5 it is assumed for simplicity that $\sigma_p/\sigma_n$=constant and lattice absorption is neglected. In FIG. 5 curve 1 represents intrinsic material, curve 2 represents $N_d=1\times10^{15}$ cm⁻³, curve 3 represents $N_d=5\times10^{15}$ cm⁻³ and curve 4 represents $N^d=1\times10^{16}$ cm⁻³ all at λ=10.6 micrometers.

The achievement of a high temperature initially transparent screen (without input illumination) is a significant consideration in the invention. The native emission of the Germanium must therefore be minimized. This is a compromise between dopant level $N_d$ and intrinsic carrier concentration $n_i$. The exponential growth of the value of $n_i$ with increasing temperature determines the upper useful temperature limit of a Germanium transducer scene. As one can see in FIG. 5, the 300 μm thick Germanium plate can be considered as practically transparent for T<450° K (the Kd<1 relation is valid).

The Dynamic Infrared Scene Projector efficiency depends on how many excess carriers a pumping source can generate. Therefore, the carrier lifetime (τ) is a significant parameter of a Dynamic Infrared Scene Projector scene. Large carrier lifetimes result in a lower pumping power value. This relationship can remarkably increase carrier concentration and simulate infrared dynamic picture generation. For moderately doped Germanium at T>300° K, the carrier lifetime values of 100 μs and longer look reasonable provided the surface recombination process is neglected. It should be noted however, that there is a trade off between the dynamic apparent temperature value and rise-fall time of the infrared picture a Dynamic Infrared Scene Projector simulates.

The impact of stray thermal input heat sources on Dynamic Infrared Scene Projector performance follows from equation 13. The initially transparent and therefore low output radiative screen is affected by both surface reflected background radiation and crystal-traversed background emission. Using a cooled chamber would minimize background radiation impact and increase the dynamic range of apparent temperatures simulated by a Dynamic Infrared Scene Projector.

The maximum power emitted is limited by the Dynamic Infrared Scene Projector screen temperature and reflectivity of the infrared screen in the spectral range where blackbody radiation is centered (see equation 12). This suggests use of an antireflection transparency coating of the surface through which the infrared radiation escapes. The front antireflection coating may be tuned to minimize the reflection coefficient R in the 3–5 um, 8–12 um or 3–12 um spectral ranges. Such antireflection transparency coating may be fabricated from ZnS, ZnSe and CdSe films for Ge and Si in the 3–12 micrometers output range and from SiO film for Ge and Si in the 3–5 micrometers output range using of course appropriate film thicknesses. It should be noted that the transducer screen infrared emission is two sided, but on the reverse side the infrared radiation may be reflected by a mirror coating reflecting back toward the observer's screen side to enhance the total forward emission as described in the FIG. 4 instance above. Likewise, to maximize conversion efficiency, the side of the screen which is illuminated by the short wavelength "visible" light to create the scene should be optimized with appropriate anti-reflection coatings for maximum absorption into the semiconductor surface. These coatings may again be fabricated from ZnS, ZnSe, CdSe, SiO films of appropriate thicknesses.

ADDITIONAL EXPERIMENTAL DATA AND SCREEN MATERIAL

Figure 6:
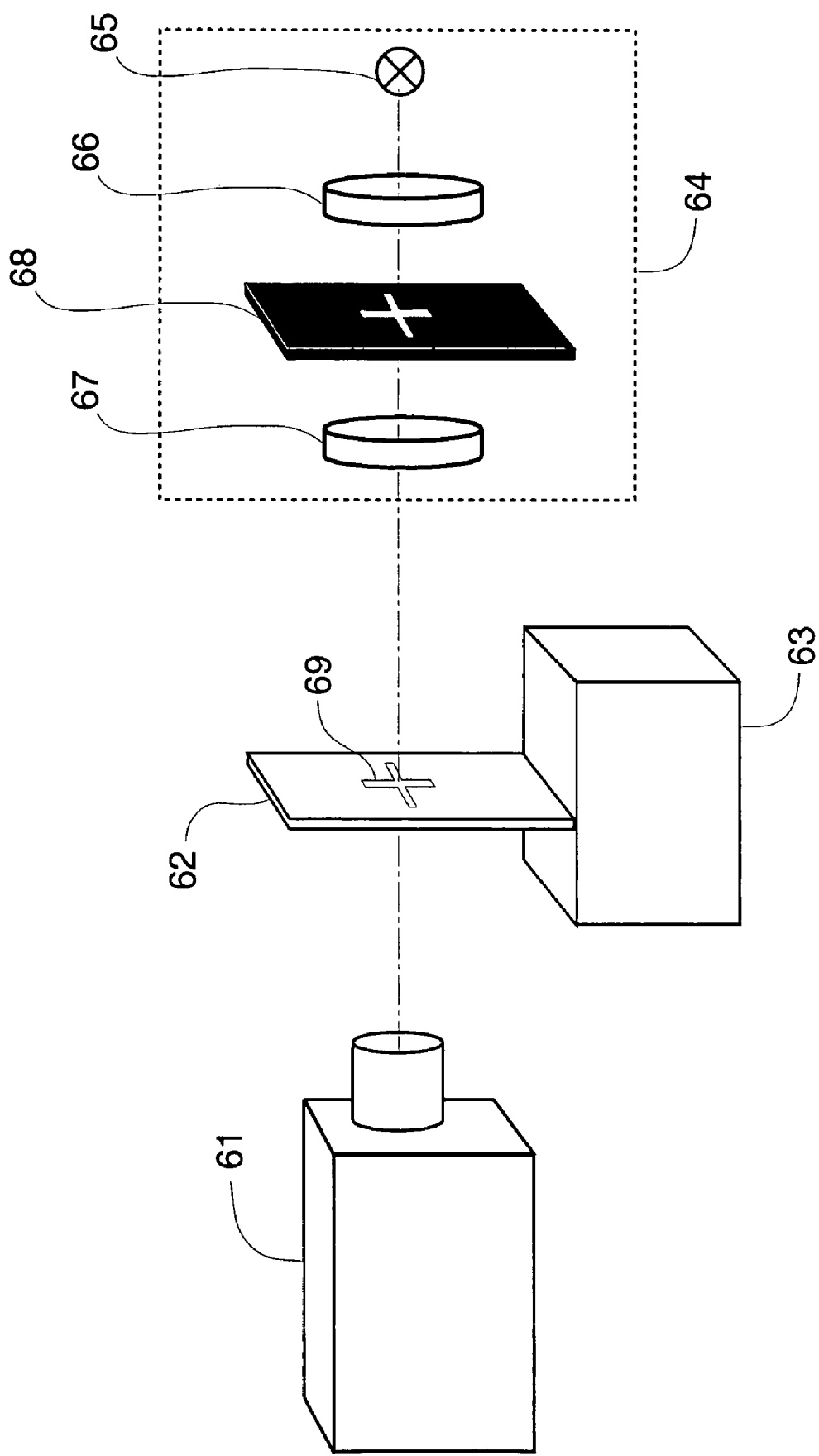
FIG. 6 shows another infrared scene generator arrangement according to the present invention in partial three-dimensional perspective.

FIG. 6 in the drawings shows another infrared scene arrangement according to the present invention. In FIG. 6 a visible light source projecting system 64 meeting the $h\omega > E_g$ condition focuses a target image 69 on front side of a semiconductor scene transducer 62 that is maintained at a given temperature ($T > T_g$). A calibrated thermal imaging camera 61 using a cooled Mercury Cadmium Telluride photo detector and having a 8–12 micrometer spectral range, images the backside of the transducer screen 62 and maps the two dimensional emissivity pattern 69 created by the excess free carriers generated by visible light. The parameters of interest in the FIG. 6 apparatus are the apparent temperature ($T_a$) or infrared power emitted, i.e., (P) values. The camera 61 measures radiance differences but not temperatures, therefore, $T_a$ and P values are connected by a calibrated signal transfer function. To measure the dynamic range the camera is synchronized with a visible light pulse in such a manner that the picture of interest appears at the second frame, whereas the first frame captures the background initial image. By subtracting these frames one can get apparent temperature difference ΔT or power emitted difference ΔP maps stimulated by the visible light generated free carriers (i.e., signal differences between illuminated and shadowed scene). Careful verification indicates the visible light pulse does not change the real scene temperature in the FIG. 6 apparatus.

Other portions of the visible to infrared down converter apparatus appearing in the FIG. 6 drawing include the screen 62 temperature controller 63, a condenser lens 66, an output lens 67, an image target of cross-like shape 68 and a light source such as a 150 watt incandescent filament lamp 65. The semiconductor screen 62 can be made of 2 millimeter thick n-type Sb-doped Germanium plate (ρ=3 ohm-cm, τ=170 μs). The screen 62 may be chemically etched to minimize the surface recombination impact on the Dynamic Infrared Scene Projector performance. A miniature heater in the temperature controller apparatus 63 maintains the screen surface real temperature up to 150° C. above the background temperature.

FIG. 7 in the drawings includes the views of FIG. 7a, FIG. 7b, FIG. 7c, FIG. 7d, FIG. 7e and FIG. 7f. Collectively these drawings show the infrared image of a target as is created by visible light received on a Germanium scene transducer screen 70 of 16×16×2 millimeter physical size and provide an infrared output scene recorded by an 8–12 micrometers spectral range responsive thermal imaging camera. The FIG. 7 transducer 70 is supported by two electrically heated support legs 71 and 72 maintained at temperature T=84° C. In the FIG. 7 drawing FIG. 7a shows a two dimensional representation of the apparent background temperature of the output scene image with the visible light in the off condition. FIG. 7b shows the $T_a$ distribution of the projected cross hair target with the visisble light present and FIG. 7c shows the distribution of apparent temperature difference $T_a$ between irradiated and shadowed scene (ΔT). FIG. 7d shows the apparent temperature difference scale key to FIG. 7c and FIG. 7e shows a three dimensional distribution of the FIG. 7c image resulting from the cross hair target. FIG. 7f shows details of the semiconductor transducer screen and its mounting and thermal appendages. The FIG. 7 images relate to the Example 1d as is disclosed above herein.

By way of further explanation of the FIG. 7 drawings, electrical heaters for maintaining the 84° C. temperature of the support legs 71 and 72 are represented at 73 and 74 in the FIG. 7f drawing. The recited temperatures relate to the FIG. 7a and FIG. 7b drawings. In the FIG. 7a drawing the camera "sees" the scene as a low contrast object with apparent temperature $T_a$=36° C. The visible light is off and therefore there is a low value of the scene initial emissivity. When the visible light projector illuminates the screen a local increase of scene emissivity creates apparent temperature ($T_{max}$=65.4° C.). By subtracting the frames one can get the IR 2D image of the target ($ΔT_{max}$=29.4° C.). The initial apparent "off" background temperature appearing in the FIG. 7 a drawing is believed to be subject to improvement with changes of screen 70 thickness, doping concentrations, anti-reflection coating, and stray light control.

Figure 8:
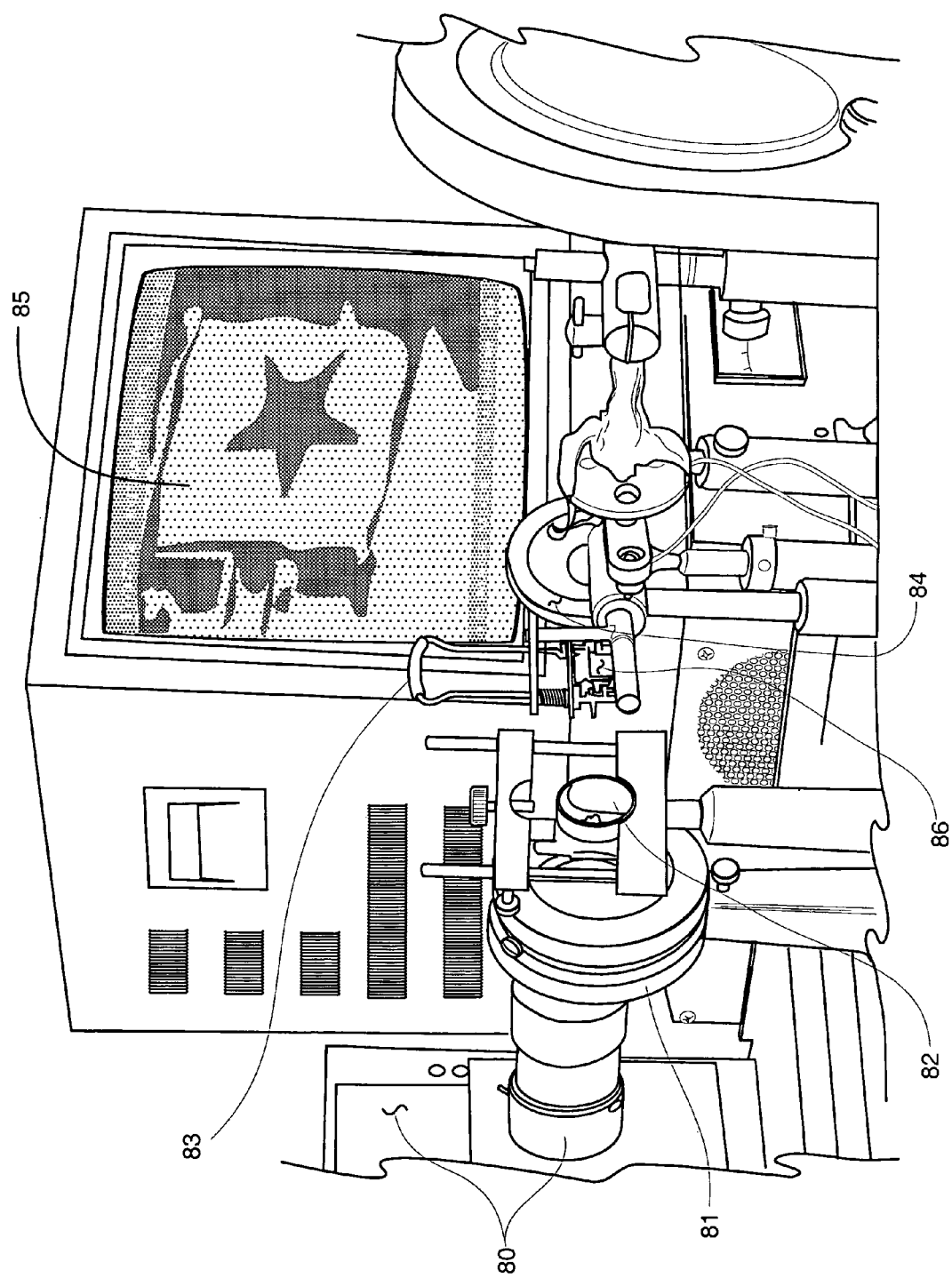
FIG. 8 shows laboratory apparatus embodying major components of the present invention.

FIG. 8 in the drawings shows a draftsman's representation of the major components in and an output image relating to a laboratory apparatus arranged according to the present invention. In the FIG. 8 drawing there appears a 150-watt incandescent light source 80, a water filter 81 to remove infrared spectral components from the output of the light source 80, a condenser lens and holder 82, a semiconductor sample holder 83 with Germanium sample 86 and a collimator lens 84 for an infrared camera. A cathode ray tube monitor appears at 85 in the FIG. 8 drawing and has displayed thereon a star image originating in the visible to infrared transducer action occurring in the sample 86. The large unidentified object at the right of the monitor 85 is a metallic mirror directing the monitor IR image backward to the Infrared camera that does not appear in the FIG. 8 drawing. The Germanium sample 86 used in the FIG. 8 apparatus includes an visible light-opaque shield having the shape of a star.

Figure 9:
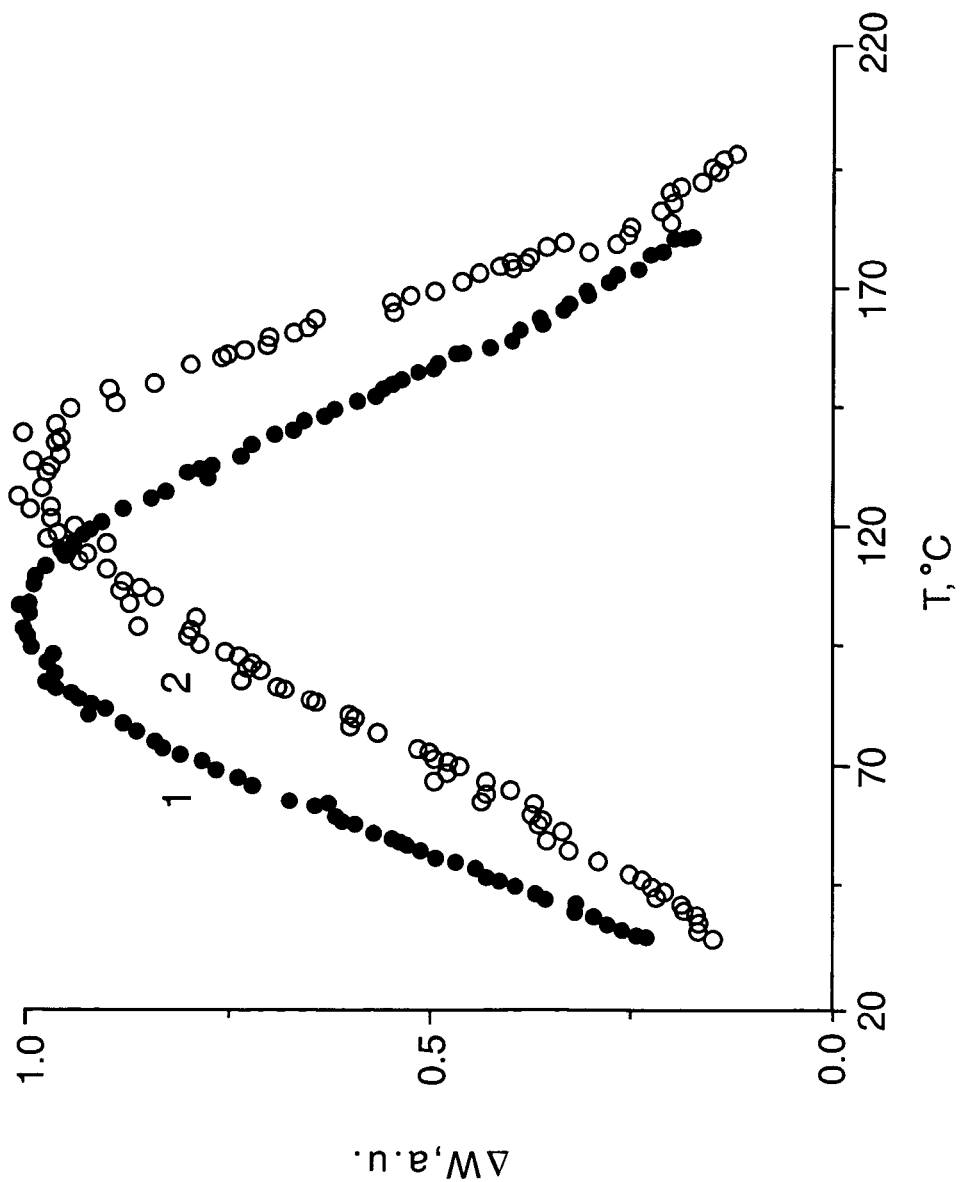
FIG. 9 shows Dynamic Infrared Scene Projector efficiency with respect to temperature and material doping.

The effect of material doping on the value of infrared power emitted by a Germanium scene transducer, i.e., a measure of Dynamic Infrared Scene Projector performance, and its temperature dependence is show in FIG. 9 of the drawings herein. In the FIG. 9 data the Germanium sample has 16×16×3.5 mm$^3$ dimensions, and curve 1 represents a resistivity, $\rho$, of 3.0 ohm-centimeter, while curve 2 represents a resistivity $\rho$ of 0.1 ohm-centimeter. The FIG. 9 results evidence that there is an optimum scene temperature and secondly, that additional n-doping permits a Dynamic Infrared Scene Projector to operate at higher temperatures.

By way of comparison and summarization Table 1 below shows a list of major characteristics of a Dynamic Infrared Scene Projector made in accordance with the present invention along with state-of-the-art Infrared Resistor array projectors produced by commercial suppliers.

Phonon assisted non-direct electron transitions in the conduction band and direct hole transitions between sub-bands of the valence band form different values of absorption cross sections ($\sigma_n < \sigma_p$) thus, intentional doping of the infrared scene transducer is a factor of Dynamic Infrared Scene Projector quality. A few miliwatts per square centimeter appears to be a typical value of dynamically modulated infrared power emitted by a scene transducer kept at reasonably high temperatures (T<450 K). Applicants are aware of certain indications to the effect that the emitted infrared power from a present invention converter may exceed the applied visible input pump power; in such instances the additional energy in the output comes from the heater.

Additionally in the present invention free carrier absorption induces a dynamic increase of semiconductor emissivity over the infrared spectral range. The maximum modulated power falls into the near and mid infrared range of 3 to 20 microns wavelength. The semiconductor screen device time response is controlled by the free carrier recombination-generation processes and is of microsecond time range. Only semiconductor melting temperature limits the possible maximum dynamically modulated apparent temperature values. The described-device requires no driving electronics. Fill factor is determined only by the spread function of the carrier diffusion and the point spread function of the visible light projector.

The technical journal article "Semiconductor Screen Dynamic Visible to Infrared Scene Converter" by V. K. Malyutenko et al., Pages 147–156, December 2002, SPIE Journal 4818 is also hereby incorporated by reference herein. The recombination process as used in the present invention is generally described in semiconductor texts including "Semiconductors" by R. A. Smith, Cambridge University Press, London, 1959, see especially pages 287–302; "Handbook on Semiconductors" Volume 2, Optical Properties of Solids, 1980, pages 423, 428–436 and "Semiconductor Opto-Electronics" published by Butter-

TABLE 1

| | Parameter | Resistor Array Projector | Semiconductor Converter |
|---|---|---|---|
| 1 | Operation principle | Equilibrium black body radiation | Visible-to IR down conversion |
| 2 | Emitter | Resistive heater/ micro-array/ | Semiconductor plate |
| 3 | Time constant | 5 ms, thermal process | <100 μs, recombination process |
| 4 | Key factor | Temperature, T | Emissivity, $\epsilon$ |
| 5 | Effective temperature range | 286–780 K | 250–780 K |
| 6 | Fill factor | 46.5% | 100% |
| 7 | Temperature contrast | $\Delta T > 0$, simulate hot objects | $\Delta T > 0$, $\Delta T < 0$, hot and cold objects |
| 8 | Cross talk | Minimum | Carrier diffusion length |
| 9 | Information source | Row-column addressing Si read-in integrated circuit | Image projected by visible light |
| 10 | Frame rate | 200 Hz | 200 Hz–20 kHz |
| 11 | Light pattern | Front side Lambertian | Both sides Lambertian |

According to the present invention therefore the emissivity and apparent temperature modulation of an optically thin heated semiconductor screen is therefore directly followed by modulation of infrared radiation emitted by the screen and is a direct effect of non-equilibrium free current carrier generation by visible pumping action in the screen semiconductor material. Free electrons and holes in the screen semiconductor generate an increase of absorption coefficient and the scene opaqueness in the screen infrared output.

worth and Company, 1973; these texts are also hereby incorporated by reference herein.

The foregoing description of the preferred embodiment has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the inventions in various embodiments and with various modifications as are suited to the particular scope of the invention as determined by the appended claims when interpreted in accordance with the breadth to which they are fairly, legally and equitably entitled.

We claim:

1. A semiconductor transducer based method of generating dynamic infrared images, said method comprising the steps of:
generating visible spectrum precursor images of said dynamic infrared images;
focusing said visible spectrum precursor images of said dynamic infrared images on an input image surface of a planar semiconductor transducer element;
collecting output dynamic infrared images from an output image surface of said planar semiconductor transducer element; and
input image surface to output image surface communication of said dynamic images within said planar semiconductor transducer element including a valence band to conduction band charged carrier photogeneration-recombination wavelength changing process.

2. The semiconductor transducer based method of generating dynamic infrared images of claim 1 wherein said semiconductor transducer element is characterized by the steps of:
absorbing energy quantums of said visible spectrum precursor images in valence band electrons located within a subsurface layer of said semiconductor material adjacent said input image surface; and
photogenerating and diffusing free charge carriers responsive to said visible spectrum absorbing step in a valence band to conduction band energy exchange located within a distance of substantially one diffusion length of said free charge carriers from said semiconductor material input image surface.

3. The semiconductor transducer based method of generating dynamic infrared images of claim 1 wherein said photogeneration-recombination wavelength changing process is characterized by a time constant of tens of microseconds.

4. The semiconductor transducer based method of generating dynamic infrared images of claim 1 wherein said step of focusing said visible spectrum precursor images of said dynamic infrared images on an input image surface of a planar semiconductor transducer element occurs on a first lateral surface of said semiconductor transducer element and said step of collecting output dynamic infrared images from an output image surface of said planar semiconductor transducer element occurs on an opposed second semiconductor transducer element lateral surface.

5. The semiconductor transducer based method of generating dynamic infrared images of claim 1 wherein said step of focusing said visible spectrum precursor images of said dynamic infrared images on an input image surface of a planar semiconductor transducer element occurs on a first lateral surface of said semiconductor transducer element and said step of collecting output dynamic infrared images from an output image surface of said planar semiconductor transducer element occurs on said same first lateral surface of said semiconductor transducer element.

6. The semiconductor transducer based method of generating dynamic infrared images of claim 1 further including one of the steps of:
maintaining said planar sample of semiconductor material at a selected operating temperature above a temperature representative of said infrared scene; and
maintaining said planar sample of semiconductor material at a selected operating temperature below a temperature representative of said infrared scene.

7. The semiconductor transducer based method of generating dynamic infrared images of claim 1 wherein said input image surface to output image surface communication of said dynamic images within said planar semiconductor transducer element includes communicating one of said visible spectrum precursor images and said output dynamic infrared images through a coating layer covering one of said input image surface and said output image surface of said planar semiconductor transducer element.

8. A broadband, high-speed, semiconductor material free-carrier-charge-based, method of generating dynamic infrared images, said method comprising the steps of:
disposing a planar sample of said semiconductor material along an optical axis extending through a source of visible image input data and an input surface of said semiconductor material;
locating an infrared image viewing apparatus proximate said optical axis adjacent one surface of said semiconductor material planar sample;
maintaining said planar sample of semiconductor material at a selected operating temperature; and
projecting a visible spectrum input optical radiation image of quantum energy level greater than a forbidden zone band-gap energy characteristic of said semiconductor material onto said semiconductor material input surface;
said projecting step enabling pumping of free carrier charges of said semiconductor material between valence band and conduction band energy states in a visible spectrum input optical image-controlled photogeneration-recombination broadband emission of infrared spectrum energy from said semiconductor material.

9. The broadband, high-speed, semiconductor material free-carrier-charge-based, method of generating dynamic infrared images of claim 8 wherein said planar sample of said semiconductor material is an optically flat polished sample of semiconductor material of selected surface recombination velocity characteristics.

10. The broadband, high-speed, semiconductor material free-carrier-charge-based, method of generating dynamic infrared images of claim 9 wherein said planar sample of said semiconductor material is an optically flat polished sample of homopolar Germanium semiconductor material.

11. The broadband, high-speed, semiconductor material free-carrier-charge-based, method of generating dynamic infrared images of claim 8 wherein said planar sample of said semiconductor material is disposed orthogonally with respect to said optical axis.

12. The broadband, high-speed, semiconductor material free-carrier-charge-based, method of generating dynamic infrared images of claim 8 wherein said planar sample of said semiconductor material is tilted toward said optical axis.

13. A method for achieving a dynamic infrared image generator transducer screen, said method comprising the steps of:
providing a wafer of semiconductor material having opposed lateral surfaces;
thermally diffusing said thin wafer to a selected n-impurity dopant hole charge carrier concentration;

said selected n-impurity dopant hole charge carrier concentration being sufficient to minimize absorption of background radiation and also achieve substantial transparency in said semiconductor material;

polishing first and second opposed surfaces of said thin wafer of semiconductor material to optical smoothness and flatness characteristics; and mounting said thin wafer of semiconductor material in a temperature controlling fixture in reception of visible spectrum dynamic input images on one of said lateral surfaces and in emission of infrared spectrum output images on one of said lateral surfaces.

14. The method for achieving a dynamic infrared image generator transducer of claim 13 wherein said wafer of semiconductor material is comprised of Germanium of thickness between 0.1 and 4 millimeters thickness.

15. Dynamic infrared image generator apparatus comprising the combination of:

a source of dynamic visible spectrum images illumination;

a planar semiconductor material energy transducer screen element disposed in a focused location of said dynamic visible spectrum images illumination;

said semiconductor material of said energy transducer screen element having a bandgap energy value smaller than a quantum energy characteristic of said visible spectrum images illumination;

said semiconductor material of said energy transducer screen element having an n-impurity doping concentration level enabling minimum absorption of natural thermal radiation by free charge carriers within said semiconductor material;

temperature control apparatus located in thermal energy communication with said planar semiconductor material energy transducer screen element; and infrared energy collection apparatus disposed adjacent an infrared energy output surface of said planar semiconductor material energy transducer screen element.

16. The dynamic infrared image generator apparatus of claim 15 wherein said temperature control apparatus located in thermal energy communication with said planar semiconductor material energy transducer screen element comprises one of a thermal cooling apparatus and a thermal heating apparatus.

17. The dynamic infrared image generator apparatus of claim 16 wherein said temperature control apparatus located in thermal energy communication with said planar semiconductor material energy transducer screen element comprises a source of electrical energy connected with said planar semiconductor material energy transducer screen element by electrical terminals received thereon and generating a heating electrical current flow in said planar semiconductor material energy transducer screen element.

18. The dynamic infrared image generator apparatus of claim 15 further including a radiant energy communicating coating layer disposed over one surface of said planar semiconductor material energy transducer screen element.

19. The dynamic infrared image generator apparatus of claim 18 further including first and second radiant energy communicating coating layers disposed over a radiant energy input first surface of said planar semiconductor material energy transducer screen element and a radiant energy output second surface of said planar semiconductor material energy transducer screen element.

20. The dynamic infrared image generator apparatus of claim 15 further including:

a background screen element disposed in parallel with one surface of said semiconductor material energy transducer screen element; and a second temperature control apparatus disposed in thermal energy communication with said background screen element and maintaining said background screen element at a temperature lower than a surrounding background temperature.

21. The dynamic infrared image generator apparatus of claim 20 wherein said background screen element is comprised of a metallic plate and wherein said metallic plate includes an infrared energy absorbing coating located on a metallic plate surface adjacent said semiconductor material energy transducer screen element.

22. The dynamic infrared image generator apparatus of claim 15 wherein said semiconductor material energy transducer screen element is comprised of one of Germanium and Silicon semiconductor materials.

23. Dynamic infrared image generation apparatus comprising the combination of:

a planar sample of optical transducer semiconductor material having opposed flat surfaces and a valence band to conduction band free charge carrier photogeneration characteristic that is responsive to visible spectrum radiant energy;

a source of dynamic visible spectrum images focused on an input one of said optical transducer semiconductor material opposed flat surfaces;

said optical transducer semiconductor material having an energy bandgap characteristic smaller than a quantum energy characteristic of illumination comprising said dynamic visible spectrum images;

a collector of infrared images focused on an output one of said optical transducer semiconductor material opposed flat surfaces; and temperature control apparatus disposed in thermal communication with said sample of optical transducer semiconductor material.

24. A broadband, high-speed, semiconductor material free-carrier-charge-based, method of generating dynamic infrared images, said method comprising the steps of:

disposing a planar transducer sample of said semiconductor material along an optical axis extending through a source of visible image input data and an input surface of said semiconductor material;

locating an infrared image viewing apparatus proximate said optical axis adjacent one surface of said semiconductor material planar transducer sample;

providing a planar background screen adjacent an input surface-opposed surface of said planar sample of semiconductor material, said background screen having a blackened surface adjacent said said planar transducer sample of semiconductor material;

maintaining said planar transducer sample of semiconductor material at a selected operating temperature;

cooling said background screen to an operating temperature below said selected operating temperature until a selected lowered background emission characteristic is achievable from said semiconductor material planar transducer sample; and projecting a visible spectrum input optical radiation image of quantum energy level greater than a forbidden zone band-gap energy characteristic of said semiconductor material onto said semiconductor material input surface;

said projecting step enabling pumping of free carrier charges of said semiconductor material between valence band and conduction band energy states.

25. The broadband, high-speed, semiconductor material free-carrier-charge-based, method of generating dynamic infrared images of claim 24 wherein said projecting step pumping of free carrier charges of said semiconductor material between valence band and conduction band energy states includes a selected minemal background photogeneration-recombination pumping response.

* * * * *